United States Patent
Vietz et al.

(10) Patent No.: US 10,301,181 B2
(45) Date of Patent: *May 28, 2019

(54) METHOD FOR DEINSTALLATION OF ROD PAIRS OF POLYSILICON PRODUCED BY THE SIEMENS PROCESS

(71) Applicant: Wacker Chemie AG, Munich (DE)

(72) Inventors: Matthias Vietz, Mattighofen (AT); Stefan Faerber, Tuessling (DE)

(73) Assignee: WACKER CHEMIE AG, Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 15/525,066

(22) PCT Filed: Oct. 29, 2015

(86) PCT No.: PCT/EP2015/075117
§ 371 (c)(1),
(2) Date: May 7, 2017

(87) PCT Pub. No.: WO2016/074939
PCT Pub. Date: May 19, 2016

(65) Prior Publication Data
US 2018/0086644 A1  Mar. 29, 2018

(30) Foreign Application Priority Data

Nov. 10, 2014 (DE) .................... 10 2014 222 883

(51) Int. Cl.
| | | |
|---|---|---|
| C23C 16/24 | (2006.01) | |
| C01B 33/035 | (2006.01) | |
| C01B 33/037 | (2006.01) | |
| B65D 33/16 | (2006.01) | |

(52) U.S. Cl.
CPC .......... *C01B 33/035* (2013.01); *C01B 33/037* (2013.01); *B65D 33/16* (2013.01)

(58) Field of Classification Search
CPC ......................... C23C 16/24; C23C 16/4418
See application file for complete search history.

(56) References Cited

U.S. PATENT DOCUMENTS

| | | | | |
|---|---|---|---|---|
| 5,433,786 A * | 7/1995 | Hu | ............ | C23C 16/30 118/715 |
| 6,221,155 B1 * | 4/2001 | Keck | ........ | C23C 16/24 117/200 |
| 2011/0229717 A1 * | 9/2011 | Kraus | ........... | C01B 33/035 428/375 |
| 2012/0175613 A1 * | 7/2012 | Netsu | ........... | C01B 33/035 257/49 |
| 2013/0269295 A1 | 10/2013 | Mattes et al. | | |
| 2014/0151259 A1 | 6/2014 | Wochner | | |
| 2014/0314654 A1 * | 10/2014 | Sofin | ........... | C01B 33/035 423/336 |
| 2014/0350502 A1 * | 11/2014 | Berland | ............ | A61F 13/42 604/361 |
| 2014/0368024 A1 * | 12/2014 | Heger | ............ | F16F 15/324 301/5.21 |
| 2015/0003952 A1 | 1/2015 | Kurosawa et al. | | |
| 2016/0067662 A1 | 3/2016 | Weiss et al. | | |
| 2017/0001868 A1 * | 1/2017 | Faerber | ............ | C30B 15/36 |

FOREIGN PATENT DOCUMENTS

| | | | |
|---|---|---|---|
| CN | 2015981183 | * | 12/2009 |
| CN | 201598183 U | | 10/2010 |
| CN | 102498064 A | | 6/2012 |
| DE | 102013206339 | | 10/2014 |
| EP | 0338682 A2 | | 10/1989 |
| EP | 2030905 A2 | | 3/2009 |
| EP | 2671819 A1 | | 12/2013 |
| JP | 2012101838 A | | 5/2012 |
| JP | 2013159504 A2 | | 8/2013 |
| TW | 201439387 A | | 10/2014 |
| TW | 201422493 A | | 6/2016 |

OTHER PUBLICATIONS

Cerva, Hans, "High-resolution electron microscopy of diamond hexagonal silicon in low pressure chemical vapor deposited polycrystalline silicon". J. Mater. Res., vol. 6, No. 11, Nov. 1991, pp. 2324-2336.*

Chunduri, Shravan Kumar, "Innovations in inertia: A survey of Siemens type CVD reactors". Photon International, Apr. 2013, pp. 114-126.*

Database WPI Week 201240 Thomson Scientific, London, GB; AN2012-G20376 XP002752879.

* cited by examiner

*Primary Examiner* — Bret P Chen
(74) *Attorney, Agent, or Firm* — Brooks Kushman P.C.

(57) ABSTRACT

Polycrystalline silicon is produced by depositing polycrystalline silicon onto U-shaped slim rods, deinstalling at least one polycrystalline silicon rod pair from the reactor, removing graphite residues from the electrode-side ends of the polycrystalline silicon rods of the polycrystalline silicon rod pair, and comminuting the polycrystalline silicon rods into rod pieces or into chunks, wherein prior to deinstallation of the polycrystalline silicon rod pairs from the reactor, the polycrystalline silicon rod pairs are at least partially with a plastics material bag made of a plastics material film having a thickness of more than 150 μm, wherein the plastics material bag comprises weights at its opening. The invention further relates to a polycrystalline silicon rod pair which has a rod diameter of 190 mm or more and is covered by a plastics material bag made of a plastics material film having a thickness of more than 150 μm.

15 Claims, No Drawings

METHOD FOR DEINSTALLATION OF ROD PAIRS OF POLYSILICON PRODUCED BY THE SIEMENS PROCESS

CROSS REFERENCE TO RELATED APPLICATIONS

This application is the U.S. National Phase of PCT Appln. No. PCT/EP2015/075117 filed Oct. 29, 2015, which claims priority to German Application No. 10 2014 222 883.2 filed Nov. 10, 2014, the disclosures of which are incorporated in their entirety by reference herein.

BACKGROUND OF THE INVENTION

1. Field of the Invention

The invention relates to a polycrystalline silicon rod pair and to a method of producing polycrystalline silicon.

2. Description of the Related Art

Polycrystalline silicon (polysilicon for short) serves as the starting material in the production of monocrystalline silicon by crucible pulling (Czochralski or "CZ" method) or by zone melting (float zone or "FZ" method). This monocrystalline silicon is cut into wafers and, after a great many mechanical, chemical and mechanochemical processing operations, is employed in the semiconductor industry for fabricating electronic components (chips).

However, in particular, polycrystalline silicon is needed to a greater extent for producing mono- or multicrystalline silicon by pulling or casting methods, this mono- or multicrystalline silicon being used for fabricating solar cells for photovoltaic applications.

The polycrystalline silicon is typically produced by the Siemens process. This comprises heating slim rods of silicon in a bell-shaped reactor (known as a "Siemens reactor") to surface temperatures of 900-1200° C. by direct passage of current, and introducing a reaction gas comprising a silicon-containing component, in particular a halosilane, and hydrogen via inlet nozzles. These halosilanes decompose at the surface of the slim rods. This causes elemental silicon from the gas phase to be deposited onto the slim rods.

The silicon rods are held in the reactor by special electrodes generally made of high-purity electrographite. In each case two slim rods having different voltage polarities on the electrode holders are connected by a bridge at the other slim rod end to form a closed electrical circuit. Electrical energy for heating the slim rods is supplied via the electrodes and their electrode holders.

The diameter of the slim rods increases during the deposition. The electrode simultaneously grows into the rod base of the silicon rods, starting at its tip.

The employed material of construction of the electrodes is generally graphite since graphite is available in very high purity and is chemically inert under deposition conditions. Graphite further has a very low specific electrical resistance.

Once a desired target diameter for the silicon rods has been achieved, the deposition process is terminated and the glowing silicon rods are cooled down and deinstalled.

Subsequently, the obtained U-shaped rod pairs made of polysilicon are typically cut to length at the electrode and bridge ends and comminuted into chunks. Comminution is carried out using a crusher, for example a jaw crusher. Such a crusher is described in EP 338 682 A2, for example. This is optionally preceded by precomminution using a hammer. The graphite electrode is typically removed beforehand.

US 20120175613 A1 discloses a method of producing a polycrystalline silicon piece consisting of a CVD process for producing a polycrystalline silicon rod by depositing silicon onto a filament wire, of which one end is attached to a first electrode and the other is attached to a second electrode, a process for removing the polycrystalline silicon rod from the reactor and a comminution process for comminuting the silicon rod into silicon pieces which comprises removing at least 70 mm from the electrode end of the polycrystalline silicon rod (base shortening process) prior to the comminution process. A preferred embodiment comprises covering the surface of the polycrystalline silicon rod with a bag-like member made of polyethylene prior to removal of the rod from the reactor.

DE 10 2013 206 339 A1 discloses a method of deinstalling polycrystalline silicon rods from a reactor, wherein the reactor comprises U-shaped rod pairs, wherein one of the U-shaped rod pairs is completely enveloped by a body having an outside wall and an inside wall, and the body, together with the rod pair enveloped by it, is removed from the reactor using a crane, a winch or a grab. The body may have an inside wall made of steel and the rod pair is covered with a plastics material bag before it is enveloped by the body.

The plastics material bags employed in the two abovementioned methods are intended to protect the polycrystalline silicon rod from contamination.

However, it was found that using plastics material bags made of PE film having a thickness of 150 μm or less can result in perforations in the plastics material bags when the bags are pulled over the polycrystalline silicon rods. Experience has shown that up to 50% of the plastics material bags employed exhibit perforations. The contamination of the polycrystalline silicon rods with foreign particles has proven particularly problematic. The origin of the foreign particles can predominantly be traced back to the destruction of the plastics material bags and film residues formed.

SUMMARY OF THE INVENTION

The object to be achieved by the invention arose from the problems previously described. These and other objects are achieved by a method of producing polycrystalline silicon comprising a) depositing polycrystalline silicon by CVD on at least one U-shaped support body heated by direct passage of current to a temperature at which polycrystalline silicon is deposited on the support body to form at least one U-shaped polycrystalline silicon rod pair, wherein each free end of the support body is connected to a respective graphite electrode and thus supplied with current;

b) deinstalling the at least one polycrystalline silicon rod pair from the reactor;

c) removing graphite residues from the electrode-side ends of the at least two polycrystalline silicon rods of the at least one polycrystalline silicon rod pair; and d) comminuting the at least two polycrystalline silicon rods into rod pieces or into chunks;

wherein prior to deinstallation of the at least one polycrystalline silicon rod pair from the reactor the at least one polycrystalline silicon rod pair is at least partially covered with a plastics material bag made of a plastics material film having a thickness of more than 150 μm, wherein the plastics material bag comprises one or more weights in the region of its opening.

The object is further achieved by a polycrystalline silicon rod pair which has a rod diameter of 190 mm or more and is covered by a plastics material bag made of a plastics material film having a thickness of more than 150 µm.

DETAILED DESCRIPTION OF THE PREFERRED EMBODIMENTS

The plastics material film is preferably made of LDPE. LDPE is polyethylene (PE) having highly branched polymer chains and thus a low density of from 0.915 g/cm$^3$ to 0.935 g/cm$^3$. LD stands for low density.

The weights provided in the region of the opening of the plastics material bag may be a single-component weight preferably arranged in radially circumferential fashion in the region of the opening.

However the weights may also be a multicomponent weight or a plurality of weight elements arranged in the region of the opening at the circumference of the plastics material bag.

The inventors have recognized that for a plastics material bag having a film thickness of more than 150 µm the stiffness of the film increases to such an extent that it is difficult to pull the plastics material bag over the silicon rod pair from above and as far as the reactor floor. Increasing rod diameters, in particular of 190 mm or more, rendered it practically impossible to pull such a plastics material bag over the rod pair.

These problems are no longer encountered in the method according to the invention. The attached weights weigh down the plastics material bag in the region of its opening and it thus becomes easier to pull the plastics material bag over the rod pair even for thick films.

Moreover, in contrast to the previously employed thinner film thicknesses fewer than 5% of the plastics material bags exhibit perforations.

The total mass of the attached weights is preferably 20% to 80% of the total mass of the plastics material film (without weights).

Suitable for this purpose are rigid weights made of stainless steel which are disposed in a protective PE shell and welded onto the plastics material bag.

Likewise suitable and particularly preferred are weights made of plastics material.

Preference is given to a flexible but stable plastics material.

Possible plastics materials for use here include polyurethane (PU), polyamide, polyethylene, polycarbonate and polyethylene terephthalate. It is likewise possible to use materials made of carbon-fiber-reinforced plastic or constituents thereof or glass-fiber-reinforced plastics materials (GRP).

PU strips in particular have proven advantageous. These are easy to handle—also in connection with an apparatus for rod deinstallation (deinstallation aid)—and may be readily attached and removed again. Such strips are thus readily reusable.

The thickness of the plastics material bag is preferably from 200 to 500 µm, preferably from 220 µm to 290 µm (as per ISO 5493/DIN 53370). The thickness is measured in a line in the middle of the sample strip at at least 10 test points distributed over the entire length (spaced no more than 20 cm apart) and the arithmetic average is determined.

The plastics material film of the plastics material bag is preferably made of LDPE having a melt flow index of 0.26 g/10 min (test temperature 190° C./test load 2.16 kg, as per ISO 1133). The melt flow index as per ISO 1133 is determined using a capillary rheometer, the material being melted in a heatable cylinder and squeezed through a defined nozzle (capillary) under a pressure exerted by the applied load. The effluxing volume/mass of the polymer melt (known as the extrudate) is determined as a function of time.

The film preferably has a puncture resistance (as per DIN EN 14477) of about 5 to 6 N. The test as per EN 14477 measures the puncture resistance toward a point of 0.8 mm in diameter. This test is also known as the Parker pen test.

It is preferable when the film tensile stress (as per DIN EN ISO 527-3) at 15% elongation is 6-7 MPa in the longitudinal direction, 8-10 MPa in the transverse direction.

It is preferable when the film breaking stress (as per DIN EN ISO 527-3) is 9-11 MPa in the longitudinal and transverse directions.

DIN EN ISO 527-3 describes how to determine film tensile stress and film breaking stress. Test specimen type 2 (strip sample) is employed. The procedure entails cutting or punching out of the film a strip-shaped test specimen of 15 mm in width and at least 150 mm in length and making two parallel measuring marks spaced 50 mm apart on the middle of the test specimen.

In one preferred embodiment the weights are removed after rod deinstallation.

Depositing polycrystalline silicon comprises introducing a reaction gas comprising a silicon-containing component and hydrogen into a CVD reactor. The silicon-containing component of the reaction gas is preferably monosilane or halosilane of general composition $SiH_nX_{4-n}$ (n=0, 1, 2, 3, 4; X=Cl, Br, I). Particular preference is given to a chlorosilane or a chlorosilane mixture. Very particular preference is given to using trichlorosilane. Monosilane and trichlorosilane are preferably employed in a mixture with hydrogen.

High-purity polysilicon is deposited onto the U-shaped support body thus causing the diameter thereof to increase over time. The deposition process is terminated once the desired diameter has been achieved.

The deinstallation of the rod pairs may be achieved using a crane, a grab or the like.

In a further embodiment the deinstallation of the at least one polycrystalline silicon rod pair from the reactor is achieved using a so-called deinstallation aid, i.e. a body which has an outside wall and an inside wall and which completely envelops the silicon rod pair, wherein the body, together with the silicon rod pair enveloped by it, is removed from the reactor using a crane, a winch or a grab.

The body is preferably dimensioned such that its length is at least equal to the height of the vertical rod pair. The width of said body is preferably at least equal to the width of a U-shaped silicon rod pair (silicon bridge+rod diameter). The width is preferably at least 200 mm, more preferably at least 300 mm.

The body preferably has an inside wall made of steel, a low-contamination hard metal or a low-abrasion ceramics material (for example tungsten carbide, titanium carbide, chromium carbide, molybdenum carbide, vanadium carbide, nickel carbide, or silicon carbide). Also preferred is the use of a body comprising a steel inside wall where the inside wall of the body has a partial or complete coating of such a low-contamination hard metal or of a low-abrasion ceramics material.

The deinstallation aid preferably has an opening through which the at least one polycrystalline silicon rod pair protrudes from, or is lifted out of, the body after removal from the reactor such that each silicon rod of the silicon rod pair protrudes by not more than 500 mm of its length out of the opening in the body, wherein the graphite residues are subsequently removed from the electrode-side ends of the at least two silicon rods.

The body preferably comprises a flap which is disposed at an opening in the body and is closable manually or by means of a mechanical or electrical mechanism and the U-shaped rod pair may therefore be completely enclosed in the body and thus lifted out of the reactor. The rod pair that has been lifted out is transported away to further processing operations preferably using a transport trolley.

The use of plastics material weights is particularly advantageous since the flexibility of the plastics material ensures that the closing mechanism of the deinstallation aid cannot suffer from jamming which could occasionally be observed when using rigid stainless steel weights. Flexible weights are thus preferred over rigid weights.

Plastics material weights likewise also prevented the avoidance of undesired Fe/Cr/Ni impurities on the polysilicon. For instance when using stainless steel weights surface contamination of the silicon with up to 12,000 pptw of Fe, 2280 pptw of Cr and 1200 ppt of Ni was detectable even when the rigid film weights were sealed off from the polysilicon by two or more layers of PE film.

The silicon rods are preferably at least partially covered by a plastics material bag during removal of the graphite residues from the electrode-side ends. The silicon rods are preferably each covered by a plastics material bag up to a distance of not less than 5 mm from the electrode-side ends. This avoids the plastics material bag being contaminated with the graphite residues.

The knocking-off of the graphite residues is preferably carried out while the at least one silicon rod pair is disposed in the deinstallation aid.

Once the rods have been lifted out of the reactor the knocking-off of the graphite residues may be carried out while the rod pair remains in the body.

To this end the rod pair is lifted out of the deinstallation aid, using a grab for example, such that each rod base protrudes out of the opening in the deinstallation aid by less than 500 mm, more preferably less than 300 mm and most preferably less than 100 mm. The knocking-off of the graphite residues from the rods is then carried out in this configuration and at least the portions of the rods that are not protruding from the opening in the deinstallation aid are covered by a plastics material bag.

The silicon rods are comminuted into rod pieces or chunks. The plastics material bag is of course removed from the rod pair first.

In the comminution into rod pieces, after removal of the graphite residues from the electrode-side ends of the rods, one or more rod pieces may be removed from one or both ends of the rods.

Particular preference is given to comminuting the silicon rods into chunks.

Comminution of the silicon rods into chunks is preferably carried out using a jaw crusher or roller crusher. This may be preceded by precomminution using suitable striking tools.

The features cited in connection with the abovedescribed embodiments of the process according to the invention may be correspondingly applied to the product according to the invention. Conversely, the features cited in connection with the abovedescribed embodiments of the product according to the invention may be correspondingly applied to the process according to the invention.

The features cited in connection with the abovedescribed embodiments of the process according to the invention may be implemented either separately or in combination as embodiments of the invention. Said features may further describe advantageous implementations eligible for protection in their own right.

By the same token the above description also encompasses alterations and modifications to the described process which are obvious to a person skilled in the art. All such alterations and modifications and also equivalents shall therefore be covered by the scope of protection of the claims.

The invention claimed is:

1. A method of producing polycrystalline silicon comprising
   a) depositing polycrystalline silicon by chemical vapor deposition on at least one U-shaped support body having two free ends, the support body heated by direct passage of current to a temperature at which polycrystalline silicon is deposited on the support body to form at least one U shaped polycrystalline silicon rod pair, wherein each free end of the support body is an electrode side end connected to a respective graphite electrode and thus supplied with current;
   b) deinstalling the at least one polycrystalline silicon rod pair from the reactor;
   c) removing graphite residues from the electrode-side ends of the at least one polycrystalline silicon rod pair; wherein prior to deinstallation of the at least one polycrystalline silicon rod pair from the reactor, the at least one polycrystalline silicon rod pair is at least partially covered with a plastic bag comprising a plastic film having a thickness of more than 150 µm, wherein the plastic bag comprises one or more weights attached to the bag in the region of its opening, and wherein the total mass of the weights is 20% to 80% of the total mass of the plastic film.

2. The method of claim 1, wherein are detached from the plastic bag following deinstallation of the at least one polycrystalline rod paid.

3. The method of claim 1, wherein the weights comprise rigid weights made of stainless steel which are disposed in one or more protective polyethylene shells, wherein the protective shells are welded onto the plastic bag.

4. The method of claim 1, wherein the weights comprise a plastic material selected from the group consisting of polyurethane, polyethylene, polyamide, polycarbonate and polyethylene terephthalate.

5. The method of claim 1, wherein the weights are constructed of carbon-fiber-reinforced plastic or glass-fiber-reinforced plastic.

6. The method of claim 1, wherein the plastic film of the plastic bag comprises low density polyethylene and has a thickness of from 200 µm to 500 µm.

7. The method of claim 6, wherein the film of low density polyethylene has a thickness of from 220 to 290 µm.

8. The method of claim 1, wherein the deinstallation of the at least one polycrystalline silicon rod pair from the reactor is achieved using a body which has an outside wall and an inside wall and which completely envelops the silicon rod pair, wherein the body, together with a silicon rod pair enveloped by it, is removed from the reactor using a crane, a winch or a grab, wherein the weights disposed at the plastic bag are removed after rod deinstallation.

9. The method of claim 8, wherein the body has an opening through which the at least one polycrystalline silicon rod pair protrudes from, or is lifted out of, the body after removal from the reactor such that each silicon rod of the silicon rod pair protrudes by not more than 500 mm of its length out of the opening in the body, wherein the graphite residues are subsequently removed from the electrode-side ends of the at least two silicon rods.

10. The method of claim 1, wherein during removal of the graphite residues from the electrode-side ends the silicon rods are each covered by the plastic bag up to a distance of not less than 5 mm from the electrode-side ends.

11. The method of claim 1, wherein the weights are disposed circumferentially around an opening in the bag.

12. The method of claim 11, wherein the weights comprise reusable polyurethane strips.

13. The method of claim 11, wherein the thickness of the plastic film is from 220 μm to 290 μm.

14. The method of claim 1, wherein the weights comprise reusable polyurethane strips.

15. The method of claim 1, where the rod diameters of the silicon rod pair are 190 mm or more.

* * * * *

UNITED STATES PATENT AND TRADEMARK OFFICE
CERTIFICATE OF CORRECTION

PATENT NO. : 10,301,181 B2  
APPLICATION NO. : 15/525066  
DATED : May 28, 2019  
INVENTOR(S) : Matthias Vietz et al.

Page 1 of 1

It is certified that error appears in the above-identified patent and that said Letters Patent is hereby corrected as shown below:

In the Claims

Column 6, Line 31, Claim 2:
After "The method of claim 1, wherein"
Insert -- the weights --.

Signed and Sealed this
Twenty-fifth Day of February, 2020

Andrei Iancu
*Director of the United States Patent and Trademark Office*